United States Patent [19]

Tsuji et al.

[11] Patent Number: 5,089,576

[45] Date of Patent: Feb. 18, 1992

[54] PROCESS FOR PRODUCING CONJUGATED DIENE COPOLYMER

[75] Inventors: Suguru Tsuji, Tokyo; Toshiaki Saya, Kamakura; Shinji Komiyama; Hayato Furusho, both of Yokohama; Tetsu Ohishi, Tokyo; Mitsuhiro Tamura, Sagamihara, all of Japan

[73] Assignee: Nippon Zeon Co., Ltd., Tokyo, Japan

[21] Appl. No.: 501,553

[22] Filed: Mar. 30, 1990

[30] Foreign Application Priority Data

Apr. 7, 1989 [JP] Japan .................................. 1-88313

[51] Int. Cl.⁵ .................................................. C08F 4/36
[52] U.S. Cl. .................................. 526/228; 526/230.5; 526/232; 526/232.3; 526/338; 526/295
[58] Field of Search .............. 526/230.5, 232.3, 338, 526/228, 232, 295

[56] References Cited

U.S. PATENT DOCUMENTS 3,652,631  3/1972  Stevens et al. ............. 526/230.5 X

FOREIGN PATENT DOCUMENTS 2054704  3/1987  Japan ................. 526/230.5

Primary Examiner—Fred Teskin
Attorney, Agent, or Firm—Sherman and Shalloway

[57] ABSTRACT

In a process for producing a conjugated diene copolymer, the improvement in which when copolymerizing a conjugated diene monomer with an ethylenically unsaturated nitrile monomer, at least one compound selected from a bifunctional peroxide represented by formula $$R_1-OO-R_2-OO-R_3 \qquad (I)$$

wherein $R_1$, $R_2$ and $R_3$ each denote a hydrocarbon group, and a bifunctional peroxycarbonate represented by formula $$R_4-OO-\overset{O}{\underset{\|}{C}}-O-R_5-O-\overset{O}{\underset{\|}{C}}-OO-R_6 \qquad (II)$$

wherein $R_4$, $R_5$ and $R_6$ each denote a hydrocarbon group, said bifunctional peroxide and peroxycarbonate being soluble in said monomers, is used as a polymerization initiator.

14 Claims, No Drawings

PROCESS FOR PRODUCING CONJUGATED DIENE COPOLYMER

This invention relates to a process for producing a copolymer composed of a conjugated diene monomer and an ethylenically unsaturated nitrile monomer and having a high average molecular weight.

As an industrial process for producing a copolymer of a conjugated diene monomer and a monoethylenically unsaturated nitrile monomer, there is an emulsion polymerization method, a solution polymerization method or a bulk polymerization method using a radical polymerization initiator such as benzoyl peroxide, tert-butylperoxypivalate, acetyl peroxide, azobisisobutylonitrile, etc.

There are however drawbacks that the copolymer obtained by the above processes is low in average molecular weight and not enough in mechanical strength required as a molding material. Moreover, according to the conventional processes, the polymerization temperature must be lowered or the amount of the polymerization initiator be decreased, as is generally known, in order to increase the average molecular weight of the copolymer. On this occasion, as the yield per unit time is notably decreased, a very large reaction apparatus is needed to provide a given amount of the copolymer.

Thus, an industrial process that can increase the average molecular weight of the resulting copolymer as well as the reaction rate has not been discovered as yet.

Accordingly, it is an object of this invention to produce a conjugated diene polymer having a higher average molecular weight without decreasing the polymerization rate.

The present inventors have made studies to achieve this object and consequently found that the aforesaid polymer can be obtained by using the specific bifunctional polymerization initiators.

This invention provides a process for producing a conjugated diene copolymer, characterized in that when copolymerizing a conjugated diene monomer with an ethylenically unsaturated nitrile monomer, at least one compound selected from a bifunctional peroxide represented by formula

$$R_1-OO-R_2-OO-R_3 \quad (I)$$

wherein $R_1$, $R_2$ and $R_3$ each denote a hydrocarbon group, and
a bifunctional peroxycarbonate represented by formula

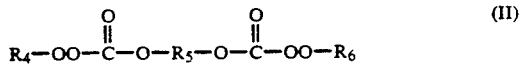

$$R_4-OO-\overset{O}{\underset{\|}{C}}-O-R_5-O-\overset{O}{\underset{\|}{C}}-OO-R_6 \quad (II)$$

wherein $R_4$, $R_5$ and $R_6$ each denote a hydrocarbon group,
said bifunctional peroxide and peroxycarbonate being soluble in said monomers, is used as a polymerization initiator.

Preferable examples of the bifunctional peroxide and the bifunctional peroxycarbonate used as the polymerization initiator in this invention are those represented by formulas (I) and (II) wherein $R_2$ and $R_5$ are hydrocarbon groups such as an alkylene group, a phenylene group, a cyclohexenylene group and an ethynylene group, and $R_1$, $R_3$, $R_4$ and $R_6$ are hydrocarbon groups such as an alkyl group the preferred alkyl groups are those having 1 to 12 carbon atoms and a phenyl group.

Examples of the bifunctional peroxide represented by formula (I) are 2,5-dimethyl-2,5-di(2-ethylhexanoylperoxy)hexane, 2,5-dimethyl-2,5-di(tert-butylperoxy)-hexane, 2,5-dimethyl-2,5-di(3,5,5-trimethylhexanoylperoxy)hexane, 2,5-dimethyl-2,5-di(benzoylperoxy)-hexane, 2,5-dimethyl-2,5-di(m-toluoylperoxy)hexane, 1,3-bis-(tert-butylperoxyisopropyl)benzene, 1,4-bis-(tert-butylperoxyisopropyl)benzene, 1,3-bis-(benzoylperoxyisopropyl)benzene, 1,4-bis-(benzoylperoxyisopropyl)benzene, 1,1-di-tert-butylperoxy-3,3,5-trimethylcyclohexane, 1,1-di-tert-butylperoxycyclohexane, 4,4-di-tert-butylperoxyvaleric acid-n-butyl ester, 2,2-di-tert-butylperoxybutane, 2,2-di-tert-butylperoxyoctane, di-tert-butyl-di-peroxyisophthalate, 2,5-dimethyl-2,5-di(tert-butylperoxy)hexine-3 and 2,5-dimethyl-2,5-di(2-ethylhexanoylperoxy)hexine-3.

Examples of the bifunctional peroxycarbonate represented by formula (II) are 1,6-hexanediol-bis-tert-butylperoxycarbonate, 1,6-hexanediol-bis-tert-amylperoxycarbonate, 1,6-hexanediol-bis-tert-octylperoxycarbonate, 1,6-hexanediol-biscumylperoxycarbonate, diethyleneglycol-bis-tert-butylperoxycarbonate, 1,3-butanediol-bis-tert-butylperoxycarbonate and 1,10-decanediol-bis-tert-butylperoxycarbonate. These compounds may be used either singly or in combination. Though the amount of the polymerization initiator is not limited in particular, it is usually 0.01 to 3% by weight based on the total weight of the conjugated diene monomer and the monoethylenically unsaturated monomer being fed to the reaction system. Moreover, one or more ordinary polymerization initiators such as benzoyl peroxide, tert-butyl peroxypivalate and acetyl peroxide may conjointly be used together with the above polymerization initiators unless impairing the effects of this invention.

Concrete examples of the conjugated diene copolymer produced by the process of this invention are a conjugated diene-ethylenically unsaturated nitrile copolymer and a conjugated diene-ethylenically unsaturated nitrile-ethylenically unsaturated monomer copolymer.

Examples of the monomers used to produce these conjugated diene copolymers are shown below.

Examples of the conjugated diene monomer are 1,3-butadiene, 2,3-dimethyl-1,3-butadiene, isoprene, 1,3-pentadiene and chloroprene.

Examples of the ethylenically unsaturated nitrile monomer are acrylonitrile and methacronitrile.

Examples of the ethylenically unsaturated monomer copolymerizable with the above monomer are unsaturated carboxylic acids such as acrylic acid, methacrylic acid, itaconic acid and maleic acid, and their salts; esters of said carboxylic acids such as methyl acrylate, 2-ethylhexyl acrylate and methyl methacrylate; alkoxyalkyl esters of said unsaturated carboxylic acids such as methoxyethyl acrylate, ethoxyethyl acrylate and methoxyethoxyethyl acrylate; amide-type monomers such as acrylamide, methacrylamide, N-methylol(meth)acrylamide, N,N'-dimethylol(meth)acrylamide and N-ethoxymethyl(meth)-acrylamide; (meth)acrylic acid cyano-substituted alkyl esters such as cyanomethyl (meth)acrylate, 2-cyanoethyl (meth)acrylate and 2-ethyl-6-cyanohexyl (meth)acrylate; and epoxy group-containing monomers such as allylglycidyl ether, glycidyl acrylate and glycidyl methacrylate.

The copolymer in this invention may be produced by bulk polymerization, solution polymerization or suspension polymerization. A small amount of an organic medium may be added in the bulk polymerization. Though the polymerization temperature varies with a process (a batchwise process or a continuous process) employed or a type of a polymerization initiator, it is usually in the range of 40° C. to 130° C.

In accordance with this invention, the copolymer having the high average molecular weight can be obtained without decreasing the polymerization rate in comparison to the polymerization of the conjugated diene monomer with the ethylenically unsaturated nitrile monomer using the ordinary radical polymerization initiators. On this occasion, the higher the polymerization temperature, the lower the viscosity of the polymerization system. The conversion to the polymer can therefore be increased, making it possible to obtain a polymer having a higher molecular weight. In consequence, the process of this invention has an extremely high industrial value compared to the conventional processes in view of both the facts that the high-molecular-weight copolymer having a high purity and an excellent strength can be afforded and the yield of the copolymer per unit time can be increased, resulting in great decrease in production cost per unit production.

The following Examples and Comparative Examples illustrate this invention more specifically. By the way, parts and percentages in said Examples and Comparative Examples are all by weight unless otherwise instructed. The amount of the peroxide used was set such that the concentration of the peroxy group became constant in said Examples and Comparative Examples being compared.

EXAMPLE 1

A starting solution was prepared by dissolving 0.15 part of 2,5-dimethyl-2,5-di(2-ethylhexanoylperoxy)-hexane in 100 parts of a monomer mixture comprising 70 parts of butadiene and 30 parts of acrylonitrile. A 3-liter cylindrical reactor fitted with an agitator having an anchor-type agitating blade was charged with the starting solution and polymerization was performed under stirring with mixing. The temperature of the reactor was kept at 60° C. After 50 hours lapsed, the reaction mixture was cooled to room temperature. Subsequently, the content was added dropwise to methyl alcohol containing hydroquinone to precipitate the resulting copolymer. The number-average molecular weight of the copolymer obtained by drying under reduced pressure was measured by high-performance liquid chromatography. The conversion to the copolymer was measured from the weight of the resulting copolymer. The results are shown in Table 1.

EXAMPLE 2

A copolymer was produced in the same way as in EXAMPLE 1 except that the polymerization initiator was changed into 0.11 part of 1,1-di-tert-butylperoxy-3,3,5-trimethylcyclohexane and the polymerization temperature into 90° C. respectively. The results are shown in Table 1.

EXAMPLE 3

A copolymer was produced in the same way as in EXAMPLE 2 except that the polymerization initiator was changed into 0.16 part of 1,6-hexanediol-bis-tert-octylperoxycarbonate. The results are shown in Table 1.

COMPARATIVE EXAMPLES 1 to 3

A copolymer was produced in the same way as in EXAMPLE 1 except that 0.15 part of benzoyl peroxide (COMPARATIVE EXAMPLE 1), or 0.12 part of tert-butylperoxypivalate (COMPARATIVE EXAMPLE 2), or 0.08 part of acetyl peroxide (COMPARATIVE EXAMPLE 3) was dissolved in 100 parts of a momomer mixture comprising 70 parts of butadiene and 30 parts of acrylonitrile. The results are shown in Table 1.

TABLE 1

| | | Polymerization initiator | Number-average molecular weight | Conversion to copolymer (%) |
|---|---|---|---|---|
| | | ($3.5 \times 10^{-4}$ mol of a polymerization initiator/100 parts of monomers) | | |
| Example | 1 | 2,5-dimethyl-2,5-di(2-ethyl-hexanoylperoxy)hexane | $7.3 \times 10^4$ | 24 |
| | 2 | 1,1-di-tert-butylperoxy-3,3,5-tri-methylcyclohexane | $6.5 \times 10^4$ | 25 |
| | 3 | 1,6-hexane-diol-bis-tert-octyl-peroxycarbonate | $7.0 \times 10^4$ | 24 |
| Comparative Example | 1 | benzoyl peroxide | $2.6 \times 10^4$ | 13 |
| | 2 | tert-butyl peroxy-pivalate | $1.9 \times 10^4$ | 19 |
| | 3 | acetyl peroxide | $2.2 \times 10^4$ | 17 |

EXAMPLE 4

A starting solution was prepared by dissolving 0.16 part of 2,5-dimethyl-2,5-di(3,5,5-trimethylhexanoylperoxy)hexane in 100 parts of a monomer mixture comprising 55 parts of butadiene, 40 parts of acrylonitrile and 5 parts of methacrylic acid. A copolymer was produced in the same way as in EXAMPLE 1 except that the above starting solution was used and the temperature of the reactor was changed into 80° C. The results are shown in Table 2.

EXAMPLE 5

A copolymer was produced in the same way as in EXAMPLE 4 except that the polymerization initiator was changed into 0.12 part of diethyleneglycol-bis-tert-butylperoxycarbonate and the polymerization temperature into 90° C. respectively. The results are shown in Table 2.

COMPARATIVE EXAMPLES 4 to 6

A copolymer was produced in the same way as in EXAMPLE 1 except that 0.15 part of benzoyl peroxide (COMPARATIVE EXAMPLE 4), or 0.12 part of tert-butyl peroxypivalate (COMPARATIVE EXAMPLE 5), or 0.08 part of acetyl peroxide (COMPARATIVE EXAMPLE 6) was dissolved in 100 parts of a monomer mixture comprising 55 parts of butadiene, 40 parts of acrylonitrile and 5 parts of methacrylic acid. The results are shown in Table 2.

TABLE 2

| | | Polymerization initiator | Number-average molecular weight | Conversion to copolymer (%) |
|---|---|---|---|---|
| | | (3.8 × 10$^{-4}$ mol of a polymerization initiator/100 parts of monomers) | | |
| Example | 4 | 2,5-dimethyl-2,5-di(3,3,5-trimethylhexanolperoxy)hexane | 8.8 × 10$^4$ | 20 |
| | 5 | diethyleneglycol-bis-tert-butylperoxycarbonate | 8.3 × 10$^4$ | 19 |
| Comparative Example | 4 | benzoyl peroxide | 3.7 × 10$^4$ | 15 |
| | 5 | tert-butyl peroxypivalate | 3.0 × 10$^4$ | 22 |
| | 6 | acetyl peroxide | 3.3 × 10$^4$ | 17 |

EXAMPLE 6

A starting solution was prepared by dissolving 0.2 part of 2,5-dimethyl-2,5-di(m-toluoylperoxy)hexane in 100 parts of a monomer mixture comprising 50 parts of butadiene, 30 parts of acrylonitrile and 20 parts of butyl acrylate. A copolymer (NBR) was produced in the same way as in EXAMPLE 1 except that the above starting solution was used and the temperature of the reactor was changed into 90° C. The results are shown in Table 3.

EXAMPLE 7

A starting solution was prepared by dissolving 0.16 part of 1,3-butanediol-bis-tert-butylperoxycarbonate in 100 parts of a monomer mixture comprising 60 parts of isoprene and 40 parts of acrylonitrile. A copolymer (NIR) was produced in the same way as in EXAMPLE 1 except that the above starting solution was used and the temperature of the reactor was changed into 90° C. The results are shown in Table 3.

COMPARATIVE EXAMPLES 7 & 8

A starting solution was prepared by dissolving 0.17 part of tert-butyl peroxypivalate in 100 parts of a monomer mixture comprising 50 parts of butadiene, 30 parts of acrylonitrile and 20 parts of butyl acrylate, or 100 parts of a monomer mixture comprising 60 parts of isoprene and 40 parts of acrylonitrile. A copolymer was produced in the same way as in EXAMPLE 1 except using the above starting solution. The results are shown in Table 3.

TABLE 3

| | | Copolymer | Polymerization initiator | Number-average molecular weight | Conversion to copolymer (%) |
|---|---|---|---|---|---|
| | | (4.8 × 10$^{-4}$ mol of a polymerization initiator/100 parts of monomers) | | | |
| Example | 6 | NBR | 2,5-dimethyl-2,5-di(m-toluoylperoxy)hexane | 5.3 × 10$^4$ | 27 |
| | 7 | NIR | 1,3-butanediol-bis-tert-butylperoxycarbonate | 9.2 × 10$^4$ | 19 |
| Comparative Example | 7 | NBR | tert-butyl peroxypivalate | 1.1 × 10$^4$ | 25 |
| | 8 | NIR | tert-butyl peroxypivalate | 3.9 × 10$^4$ | 22 |

From the results shown in Tables 1 to 3, it follows that the use of the polymerization initiators in this invention can give the copolymers having the higher molecular weights than the use of the ordinary polymerization initiators.

EXAMPLE 8

The polymerization was performed as in EXAMPLE 1 except that the temperature of the reactor was changed into 70° C. After the conversion reached 24%, the temperature was lowered to room temperature, and a copolymer was obtained as in Example 1. The results are shown in Table 4.

EXAMPLE 9

The polymerization was conducted as in EXAMPLE 8 except that the temperature of the reactor in EXAMPLE 2 was changed into 105° C. to obtain a copolymer. The results are shown in Table 4.

EXAMPLE 10

The polymerization was conducted as in EXAMPLE 8 except that the temperature of the reactor in EXAMPLE 3 was changed into 105° C. to obtain a copolymer. The results are shown in Table 4.

TABLE 4

| Example | Time that lapses until conversion reaches 24% (hr) | Molecular weight |
|---|---|---|
| 8 | 26 | 7.5 × 10$^4$ |
| 9 | 20 | 6.5 × 10$^4$ |
| 10 | 27 | 7.3 × 10$^4$ |

From Table 4, it becomes apparent that the bifunctional peroxide of this invention is characterized in that even if the reaction rate is increased by increasing the reaction temperature, the molecular weight is not decreased.

EXAMPLE 11

A starting solution was prepared by adding 40 parts of toluene to 100 parts of a monomer mixture comprising 70 parts of butadiene and 30 parts of acrylonitrile and dissolving 0.8 part of 2,5-dimethyl-2,5-di-(2-ethylhexanoylperoxy)hexane. A 3-liter cylindrical reactor fitted with an agitator having an anchor-type agitating blade was charged with said starting solution and polymerization was performed under mixing with stirring. The temperature of the reactor was kept at 65° C. After 50 hours lapsed, the temperature was lowered to room temperature. Subsequently, the content was added dropwise to methyl alcohol containing hydroquinone to precipitate the resulting polymer. The number-average molecular weight of the copolymer obtained by drying under reduced pressure was measured by high-perfor-

EXAMPLE 12

A copolymer was produced as in EXAMPLE 11 except that the polymerization initiator was changed into 0.6 part of 1,1-di-tert-butylperoxy-3,3,5-trimethylcyclohexane, the organic medium into 80 parts of methyl ethyl ketone and the polymerization temperature into 90° C. respectively. The results are shown in Table 5.

EXAMPLE 13

A copolymer was produced as in EXAMPLE 12 except that the polymerization initiator was changed into 0.85 part of 1,6-hexanediol-bis-tert-octylperoxycarbonate and the organic medium into 15 parts of n-butane respectively. The results are shown in Table 5.

COMPARATIVE EXAMPLES 9 to 11

A copolymer was produced as in EXAMPLE 11 except that 0.8 part of benzoyl peroxide (COMPARATIVE EXAMPLE 9), or 0.65 part of tert-butyl peroxypivalate (COMPARATIVE EXAMPLE 10) or 0.45 part of acetyl peroxide (COMPARATIVE EXAMPLE 11) was dissolved in 100 parts of a monomer mixture comprising 70 parts of butadiene and 30 parts of acrylonitrile. The results are shown in Table 5.

EXAMPLE 14

Seventy parts of butadiene, 30 parts of acrylonitrile, 150 parts of water, 1 part of polyvinyl alcohol and 0.15 part of 2,5-dimethyl-2,5-di(2-ethylhexanoylperoxy)hexane were charged into a reactor and dispersed with stirring. The reaction was conducted as in EXAMPLE 11 except that the agitating blade was changed into a paddle-type agitating blade. There was obtained a copolymer. The results are shown in Table 6.

COMPARATIVE EXAMPLE 12

A copolymer was produced as in EXAMPLE 14 except that the polymerization initiator was changed into 0.12 part of ter-butyl peroxypivalate. The results are shown in Table 6.

TABLE 6

| | Polymerization initiator | Amount (mol) of polymerization initiator per 100 parts of monomers | Number-average molecular weight | Conversion to copolymer (%) |
|---|---|---|---|---|
| Example 11 | 2,5-dimethyl-2,5-di(2-ethyl-hexanoylperoxy)hexane | $3.5 \times 10^{-4}$ | $7.6 \times 10^4$ | 25 |
| Comparative Example 12 | tert-butyl peroxypivalate | $2.8 \times 10^{-4}$ | $2.0 \times 10^4$ | 19 |

Table 6 reveals that even if the medium in the polymerization is changed, the use of the polymerization initiator in this invention can give the copolymer having the high molecular weight.

What is claimed is:

1. In a process for producing a conjugated diene copolymer, the improvement in which comprises copolymerizing a conjugated diene monomer with an ethylenically unsaturated nitrile monomer using as a polymerization initiator, at least one compound selected from a bifunctional peroxide represented by formula $$R_1-OO-R_2-OO-R_3 \qquad (I)$$

wherein $R_1$ and $R_3$ are each an alkyl group having 1 to 12 carbon atoms, an acyl group selected from the group

TABLE 5

(1.7 × 10⁻³ mol of a polymerization initiator/100 parts of monomers in EXAMPLES: in COMPARATIVE EXAMPLES, the amount was twice the above amount.)

| | | Polymerization initiator | Organic medium (parts) | Number-average molecular weight | Conversion to copolymer (%) |
|---|---|---|---|---|---|
| Example | 11 | 2,5-dimethyl-2,5-di(2-ethyl-hexanoylperoxy)hexane | toluene (40) | $6.2 \times 10^4$ | 35 |
| | 12 | 1,1-di-tert-butylperoxy-3,3,5-trimethylcyclohexane | methyl ethyl ketone (80) | $4.7 \times 10^4$ | 37 |
| | 13 | 1,6-hexanediol-bis-tert-octyl-peroxycarbonate | n-butane (15) | $6.9 \times 10^4$ | 33 |
| Comparative Example | 9 | benzoyl peroxide | toluene (40) | $1.8 \times 10^4$ | 14 |
| | 10 | tert-butyl-peroxypivalate | toluene (40) | $1.1 \times 10^4$ | 19 |
| | 11 | acetyl peroxide | toluene (40) | $1.3 \times 10^4$ | 15 | consisting of 2-ethylhexanoyl, 3.5.5-trimethylhexanoyl, benzoyl and toluoyl, or a phenyl group, and $R_2$ is an alkylene group, a phenylene group, a cyclohexenylene group or an ethynylene group, said bifunctional peroxide being soluble in said monomers.

2. In a process for producing a conjugated diene copolymer, the improvement in which comprises copolymerizing a conjugated diene monomer with an ethylenically unsaturated nitrile monomer using as a polymerization initiator, at least one compound selected from a bifunctional peroxide represented by formula $$R_1-OO-R_2-OO-R_3 \qquad (I)$$

wherein $R_1$ and $R_3$ are each an alkyl group having 1 to 12 carbon atoms, an acyl group selected from the group consisting of 2-ethylhexanoyl, 3.5.5-trimethylhexanoyl, benzoyl and toluoyl, or a phenyl group, and $R_2$ is an alkylene group, a phenylene group, a cyclohexenylene group or an ethynylene group and a bifunctional peroxycarbonate represented by formula

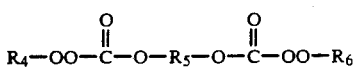

wherein $R_4$, $R_5$ and $R_6$ each denote a hydrocarbon group, said bifunctional peroxide and peroxycarbonate being soluble in said monomers.

3. The process of claim 2 using a bifunctional peroxycarbonate of formula (II) wherein $R_4$ and $R_6$ are each an alkyl group having 1 to 12 carbon atoms or a phenyl group, and $R_5$ is an alkylene group, a phenylene group, a cyclohexenylene group or an ethynylene group.

4. The process of claim 1 wherein the conjugated diene monomer is at least one type selected from 1,3-butadiene, 2,3-dimethyl-1,3-butadiene, isoprene, 1,3-pentadiene and chloroprene.

5. The process of claim 1 wherein the ethylenically unsaturated nitrile monomer is acrylonitrile.

6. The process of claim 1 wherein the copolymer is produced by bulk polymerization.

7. The process of claim 1 wherein the copolymer is produced by suspension polymerization.

8. The process of claim 1 wherein the copolymer is produced by solution polymerization.

9. The process of claim 2, wherein $R_1$ and $R_3$ is an acyl group.

10. The process of claim 2, wherein the conjugated diene monomer is at least one type selected from 1,3-butadiene, 2,3-dimethyl-1,3-butadiene, isoprene, 1,3-pentadiene and chloroprene.

11. The process of claim 2, wherein the ethylenically unsaturated nitrile monomer is acrylonitrile.

12. The process of claim 2, wherein the copolymer is produced by bulk polymerization.

13. The process of claim 2, wherein the copolymer is produced by suspension polymerization.

14. The process of claim 2 wherein the copolymer is produced by solution polymerization.